US012652376B2

(12) United States Patent
Xie et al.

(10) Patent No.: US 12,652,376 B2
(45) Date of Patent: Jun. 9, 2026

(54) METHOD AND SYSTEM FOR EXTRACTING DENSE DISPARITY MAP BASED ON MULTI-SENSOR FUSION, AND INTELLIGENT TERMINAL

(71) Applicant: Beijing Smarter Eye Technology Co. Ltd, Beijing (CN)

(72) Inventors: Qiwei Xie, Beijing (CN); Ran Meng, Beijing (CN); Hua Chai, Beijing (CN); An Jiang, Beijing (CN); Feng Cui, Beijing (CN)

(73) Assignee: Beijing Smarter Eye Technology Co. Ltd, Beijing (CN)

( * ) Notice: Subject to any disclaimer, the term of this patent is extended or adjusted under 35 U.S.C. 154(b) by 427 days.

(21) Appl. No.: 18/065,322

(22) Filed: Dec. 13, 2022

(65) Prior Publication Data

US 2023/0199163 A1 Jun. 22, 2023

(30) Foreign Application Priority Data

Dec. 21, 2021 (CN) .......................... 202111570650.6

(51) Int. Cl.
| | |
|---|---|
| *G06V 40/16* | (2022.01) |
| *G06T 7/521* | (2017.01) |
| *G06T 7/593* | (2017.01) |
| *H04N 13/271* | (2018.01) |

(52) U.S. Cl.
CPC ........... *H04N 13/271* (2018.05); *G06T 7/521* (2017.01); *G06T 7/593* (2017.01); *G06T 2207/10028* (2013.01)

(58) Field of Classification Search
CPC .............. H04N 13/271; H04N 13/239; H04N 2013/0081; H04N 13/106; H04N 13/128; G06T 7/521; G06T 7/593; G06T 2207/10028; G06F 18/22; G06F 18/25
See application file for complete search history.

(56) References Cited

U.S. PATENT DOCUMENTS

| | | | | |
|---|---|---|---|---|
| 2019/0295282 A1* | 9/2019 | Smolyanskiy | ........ | G01S 13/867 |
| 2019/0333237 A1* | 10/2019 | Javidnia | .................. | G06T 7/593 |
| 2021/0278852 A1* | 9/2021 | Urtasun | .................. | G06T 17/05 |

* cited by examiner

*Primary Examiner* — Amandeep Saini
*Assistant Examiner* — Mehrazul Islam
(74) *Attorney, Agent, or Firm* — NKL Law; Allen Xue

(57) ABSTRACT

A method and a system for extracting a dense disparity map based on multi-sensor fusion are provided. The method includes: obtaining a left-eye image and a right-eye image in a same road scenario, and point cloud information about the road scenario; generating an initial cost volume map set in accordance with the left-eye image, the right-eye image and the point cloud information; performing multidirectional cost aggregation in accordance with the point cloud information and the initial cost volume map set, and creating an energy function in accordance with the cost aggregation; and solving an optimum disparity for each pixel in the left-eye image in accordance with the energy function, so as to generate the dense disparity map.

2 Claims, 2 Drawing Sheets

S1 — obtaining a left-eye image and a right-eye image in a same road scenario, and point cloud information about the road scenario S2 — generating an initial cost volume map set in accordance with the left-eye image, the right-eye image and the point cloud information S3 — performing multidirectional cost aggregation in accordance with the point cloud information and the initial cost volume map set, and creating an energy function in accordance with the cost aggregation S4 — solving an optimum disparity for each pixel in the left-eye image in accordance with the energy function, so as to generate the dense disparity map

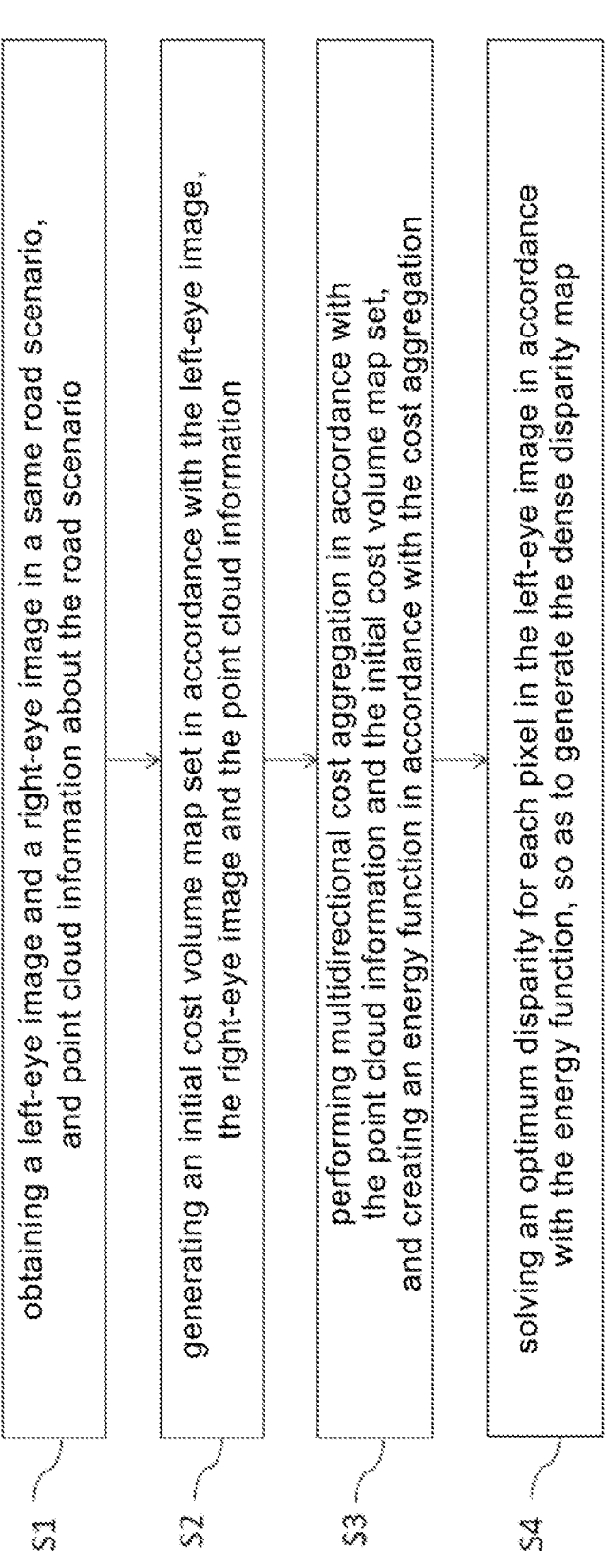

S1 obtaining a left-eye image and a right-eye image in a same road scenario, and point cloud information about the road scenario S2 generating an initial cost volume map set in accordance with the left-eye image, the right-eye image and the point cloud information S3 performing multidirectional cost aggregation in accordance with the point cloud information and the initial cost volume map set, and creating an energy function in accordance with the cost aggregation S4 solving an optimum disparity for each pixel in the left-eye image in accordance with the energy function, so as to generate the dense disparity map

FIG. 1

METHOD AND SYSTEM FOR EXTRACTING DENSE DISPARITY MAP BASED ON MULTI-SENSOR FUSION, AND INTELLIGENT TERMINAL

TECHNICAL FIELD

The present disclosure relates to the field of assistant driving technology, in particular to a method and a system for extracting a dense disparity map based on multi-sensor fusion, and an intelligent terminal.

BACKGROUND

Currently, the binocular stereo vision technology has been widely used in various fields. In the binocular stereo vision technology, stereo matching is one of core techniques for a stereo vision system, and an environment sensing ability and a scenario understanding ability of a sensor are directly affected by accuracy of a disparity map. Hence, there is an urgent need to provide a method for extracting a dense disparity map based on multi-sensor fusion, so as to improve the accuracy of the binocular stereo vision system for solving the disparity.

SUMMARY

An object of the present disclosure is to provide a method and a system for extracting a dense disparity map based on multi-sensor fusion, and an intelligent terminal, so as to improve the accuracy of the binocular stereo vision system for solving the disparity.

In order to achieve the above-mentioned purpose, the present disclosure provides the following technical solutions.

In one aspect, the present disclosure provides in some embodiments a method for extracting a dense disparity map based on multi-sensor fusion, including: obtaining a left-eye image and a right-eye image in a same road scenario, and point cloud information about the road scenario; generating an initial cost volume map set in accordance with the left-eye image, the right-eye image and the point cloud information; performing multidirectional cost aggregation in accordance with the point cloud information and the initial cost volume map set, and creating an energy function in accordance with the cost aggregation; and solving an optimum disparity for each pixel in the left-eye image in accordance with the energy function, so as to generate the dense disparity map.

In a possible embodiment of the present disclosure, the point cloud information is real physical three-dimension coordinates (x, y, z) obtained by a laser radar sensing system within a sensing range.

In a possible embodiment of the present disclosure, the generating the initial cost volume map set in accordance with the left-eye image, the right-eye image and the point cloud information includes: selecting a template window with a constant size in the left-eye image, and selecting a sliding window with a same size in the right-eye image in a traversing manner; enabling a maximum sliding distance to correspond to a maximum disparity $Disp_{max}$, and calculating a structural similarity value between the template window and each sliding window to obtain a cost volume; enabling a cost volume corresponding to a current sliding distance to be 0 and enabling a cost volume corresponding to the other sliding distance to be a maximum value when a sliding distance u and depth information z in the point cloud information meet u=bf/z, where b represents a length of a baseline of a binocular camera imaging system and f represents a focal length of a camera; and repeating the steps with respect to each pixel point in the left-eye image to generate the initial cost volume map set.

In a possible embodiment of the present disclosure, the calculating the structural similarity value includes calculating the structural similarity value using a Structural Similarity (SSIM) operator through, $$SSIM(disp,\ p) = \frac{(2\mu_\phi\mu_\phi + C1)(\sigma_{\varphi\psi} + C2)}{(\mu_\varphi^2 + \mu_\psi^2 + C1)(\sigma_\varphi^2 + \sigma_\psi^2 + C2)},$$

where $\mu$ represents an average value, $\sigma^2$ represents a variance, $\sigma$ represents a standard deviation, and C1 and C2 are constants.

In a possible embodiment of the present disclosure, the performing the multidirectional cost aggregation in accordance with the point cloud information and the initial cost volume map set includes: creating the energy function through $$E_r(disp,\ p) =$$

$$SSIM(disp,\ p) + \min\begin{Bmatrix} E_r(disp,\ p-r) \\ E_r(disp-1,\ p-r)+P1 \\ E_r(disp+1,\ p-r)+P1 \\ \min_i E_r(i,\ p-r)+P2 \end{Bmatrix} - \min_i E_r(i,\ p-r),$$

where $E_r(disp,p)$ represents a path cost for a pixel p along a direction r, a first term SSIM(disp,p) represents an initial cost value for the pixel p when the disparity is disp, a second term is a smoothing term, a penalty parameter P1 is added when a change between adjacent disparities in the direction r is 1, and a penalty parameter P2 is added when the change between the adjacent disparities in the direction r is greater than 1; and aggregating data terms in the path cost, each pixel p corresponding to r path cost values when the disparity is disp, and calculating a sum of a plurality of path cost values through $$C(disp,\ p) = \sum_r E_r(disp,\ p)$$

to obtain an aggregation cost value.

In a possible embodiment of the present disclosure, the penalty parameter P1 and the penalty parameter P2 are obtained through $$P1 = \begin{cases} 0 & \text{if}(p-r \text{ include pt\_lidar}) \\ P1 & \text{if}(p-r \text{ include pt\_unlidar}) \end{cases}$$

$$P2 = \begin{cases} 0 & \text{if}(p-r \text{ include pt\_lidar}) \\ P2 & \text{if}(p-r \text{ include pt\_unlidar}) \end{cases},$$

where pt_lidar represents a point in the left-eye image corresponding to the point cloud information, and pt_unlidar represents a point in the left-eye image not corresponding to the point cloud information.

In a possible embodiment of the present disclosure, the solving the optimum disparity for each pixel in the left-eye image in accordance with the energy function so as to generate the dense disparity map includes selecting a minimum value of the aggregation cost values as a final disparity so as to generate the dense disparity map.

In another aspect, the present disclosure provides in some embodiments a system for extracting a dense disparity map based on multi-sensor fusion, including: a basic information obtaining unit configured to obtain a left-eye image and a right-eye image in a same road scenario, and point cloud information about the road scenario; a cost volume map set obtaining unit configured to obtain an initial cost volume map set in accordance with the left-eye image, the right-eye image and the point cloud information; an energy function creation unit configured to perform multidirectional cost aggregation in accordance with the point cloud information and the initial cost volume map set, and create an energy function in accordance with the cost aggregation; and a disparity map output unit configured to solve an optimum disparity for each pixel in the left-eye image in accordance with the energy function, so as to generate the dense disparity map.

In yet another aspect, the present disclosure provides in some embodiments an intelligent terminal, including a data collection device, a processor and a memory. The data collection device is configured to collect data, the memory is configured to store therein one or more program instructions, and the processor is configured to execute the one or more program instructions so as to implement the above-mentioned method.

In still yet another aspect, the present disclosure provides in some embodiments a computer-readable storage medium storing therein one or more program instructions. The one or more program instructions are executed to implement the above-mentioned method.

According to the embodiments of the present disclosure, the initial cost volume map set is generated in accordance with the left-eye image and the right-eye image, the cost aggregation is performed in accordance with the point cloud information obtained by the laser radar sensing system and the initial cost volume map set to create the energy function, and the optimum disparity for each pixel is solved in the left-eye image through the energy function, so as to generate the dense disparity map. The disparity is calculated in accordance with binocular disparity information and depth information obtained through the laser radar sensing system, so as to extract the dense disparity map accurately, thereby to improve the accuracy of the binocular stereo vision system for solving the disparity.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they have not substantial meanings technically. Any modification on the structure, any change to the scale or any adjustment on the size shall also fall within the scope of the present disclosure in the case of not influencing the effects and the purposes of the present disclosure.

FIG. 1 is a flow chart of a method for extracting a dense disparity map based on multi-sensor fusion according to one embodiment of the present disclosure.

DETAILED DESCRIPTION

Figure 2:
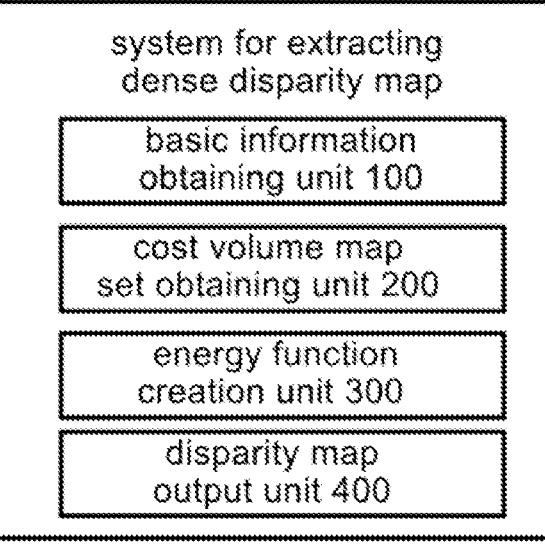
FIG. 2 is a block diagram of a system for extracting a dense disparity map based on multi-sensor fusion according to one embodiment of the present disclosure.

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

An object of the present disclosure is to provide a method for extracting a dense disparity map based on multi-sensor fusion, so as to improve the accuracy of an individual binocular stereo vision system for solving a disparity, thereby to rapidly and accurately obtain the dense disparity map in a scenario through a multi-sensor fusion technology.

As shown in FIG. 1, the present disclosure provides in some embodiments a method for extracting a dense disparity map based on multi-sensor fusion, which includes the following steps.

S1: obtaining a left-eye image and a right-eye image in a same road scenario, and point cloud information about the road scenario.

In the embodiments of the present disclosure, each pixel in the left-eye image has accurate disparity information at a same pixel position in the dense disparity map.

In other words, the left-eye image and the right-eye image in the same road scenario are obtained through a stereo imaging system, and the point cloud information about the road scenario is obtained through a laser radar sensing system. The point cloud information is real physical three-dimension coordinates (x, y, z) obtained by the laser radar sensing system within a sensing range.

S2: generating an initial cost volume map set in accordance with the left-eye image, the right-eye image and the point cloud information.

S2 of generating the initial cost volume map set specifically includes: S21 of selecting a template window with a constant size in the left-eye image, and selecting a sliding window with a same size in the right-eye image in a traversing manner; S22 of enabling a maximum sliding distance to correspond to a maximum disparity $\text{Disp}_{max}$, and calculating a structural similarity value between the template window and each sliding window to obtain a cost volume; S23 of enabling a cost volume corresponding to a current sliding distance to be 0, enabling a cost volume corresponding to the other sliding distance to be a maximum value when a sliding distance u and depth information z in the point cloud information meet u=bf/z, and repeating the steps with respect to each pixel point in the left-eye image to generate the initial cost volume map set, where b represents a length of a baseline of a binocular camera imaging system and f represents a focal length of a camera.

In S22, the calculating the structural similarity value includes calculating the structural similarity value using a Structural Similarity (SSIM) operator through $$SSIM(disp,\ p) = \frac{(2\mu_\phi\mu_\phi + C1)(\sigma_{\varphi\psi} + C2)}{(\mu_\varphi^2 + \mu_\psi^2 + C1)(\sigma_\varphi^2 + \sigma_\psi^2 + C2)},$$

where μ represents an average value, $\sigma^2$ represents a variance, σ represents a standard deviation, and C1 and C2 are constants.

In other words, similarity of two images are measured through the SSIM operator. To be specific, SSIM(disp,p)=$l^\alpha$ $(\varphi,\psi)c^\beta(\varphi,\psi)s^\gamma(\varphi,\psi)$, where disp represents a horizontal pixel value difference between the template window and the sliding window, p represents a position of a central point of the template window, $l^\alpha(\varphi,\psi)$ represents brightness comparison between the template window and the sliding window, $c^\beta(\varphi,\psi)$ represents contrast comparison between the template window and the sliding window, and $s^\gamma(\varphi,\psi)$ represents structure comparison between the template window and the sliding window.

In the above formula, the parameters are obtained as follows:

$$l(\varphi, \psi) = \frac{2\mu_\phi\mu_\psi + C1}{\mu_\varphi^2 + \mu_\psi^2 + C1}$$

$$c(\varphi, \psi) = \frac{2\sigma_\phi\sigma_\psi + C2}{\sigma_\varphi^2 + \sigma_\psi^2 + C2}$$

$$s(\varphi, \psi) = \frac{\sigma_\phi\sigma_\psi + C3}{\sigma_{\varphi\psi}^2 + C3},$$

where μ, $\sigma^2$ and σ represent a mean value, a variance and a standard deviation respectively, and C1 and C2 are constants. In actual use, $$SSIM(disp, p) = \frac{(2\mu_\phi\mu_\psi + C1)(\sigma_{\varphi\psi} + C2)}{(\mu_\varphi^2 + \mu_\psi^2 + C1)(\sigma_\varphi^2 + \sigma_\psi^2 + C2)}.$$

The structural similarity value is normalized to be between 0 and 1. The larger the structural similarity value, the smaller the similarity between the template window and the sliding window.

S3: performing multidirectional cost aggregation in accordance with the point cloud information and the initial cost volume map set, and creating an energy function in accordance with the cost aggregation.

The performing the multidirectional cost aggregation includes: creating the energy function through $$E_r(disp, p) =$$

$$SSIM(disp, p) + min\begin{Bmatrix} E_r(disp, p - r) \\ E_r(disp - 1, p - r) + P1 \\ E_r(disp + 1, p - r) + P1 \\ \min_i E_r(i, p - r) + P2 \end{Bmatrix} - \min_i E_r(i, p - r),$$

where $E_r$(disp,p) represents a path cost for a pixel p along a direction r, a first term SSIM(disp,p) represents an initial cost value for the pixel p when the disparity is disp, a second term is a smoothing term, a penalty parameter P1 is added when a change between adjacent disparities in the direction r is 1, and a penalty parameter P2 is added when the change between the adjacent disparities in the direction r is greater than 1; and aggregating data terms in the path cost, each pixel p corresponding to r path cost values when the disparity is disp, and calculating a sum of a plurality of path cost values through $$C(disp, p) = \sum_r E_r(disp, p)$$

to obtain an aggregation cost value.

Different values are set in accordance with the point cloud information obtained by the laser radar sensing system. Each point in the left-eye image corresponding to the point cloud information obtained by the laser radar sensing system is recorded as pt_lidar, and each point in the left-eye image not corresponding to the point cloud information obtained by the laser radar sensing system is recorded as pt_unlidar. Hence, the penalty parameter P1 and the penalty parameter P2 are obtained through $$P1 = \begin{cases} 0 & if(p - r \text{ include pt\_lidar}) \\ P1 & if(p - r \text{ include pt\_unlidar}) \end{cases}$$

$$P2 = \begin{cases} 0 & if(p - r \text{ include pt\_lidar}) \\ P2 & if(p - r \text{ include pt\_unlidar}) \end{cases},$$

where pt_lidar represents the point in the left-eye image corresponding to the point cloud information, and pt_unlidar represents the point in the left-eye image not corresponding to the point cloud information.

When setting the penalty parameters, the penalty parameter P1 with a smaller value is provided for a small disparity difference so as to be adapted to an oblique or curved surface, and the penalty parameter P2 with a larger value is provided for a large disparity difference so as to prevent the occurrence of a discontinuous depth (disparity).

S4: solving an optimum disparity for each pixel in the left-eye image in accordance with the energy function, so as to generate the dense disparity map.

To be specific, a disparity corresponding to a minimum aggregation cost value is selected as the optimum disparity so as to generate the dense disparity map. The pixel p has different aggregation cost values C (disp, p) with respect to different disparities disp, and the disparity corresponding to the minimum aggregation cost value as the optimum disparity. The above steps S1 to S3 are repeated with respect to each pixel point in the left-eye image, so as to generate the dense disparity map.

According to the method in the embodiments of the present disclosure, the initial cost volume map set is generated in accordance with the left-eye image and the right-eye image, the cost aggregation is performed in accordance with the point cloud information obtained by the laser radar sensing system and the initial cost volume map set to create the energy function, and the optimum disparity for each pixel is solved in the left-eye image through the energy function, so as to generate the dense disparity map. The disparity is calculated in accordance with binocular disparity information and depth information obtained through the laser radar sensing system, so as to extract the dense disparity map accurately, thereby to improve the accuracy of the binocular stereo vision system for solving the disparity.

The present disclosure further provides in some embodiments a system for extracting a dense disparity map based on multi-sensor fusion which, as shown in FIG. 2, includes: a basic information obtaining unit 100 configured to obtain a left-eye image and a right-eye image in a same road scenario, and point cloud information about the road scenario; a cost volume map set obtaining unit 200 configured to obtain an initial cost volume map set in accordance with the left-eye image, the right-eye image and the point cloud information; an energy function creation unit 300 configured to perform multidirectional cost aggregation in accordance with the point cloud information and the initial cost volume map set, and create an energy function in accordance with the cost aggregation; and a disparity map output unit 400 configured to solve an optimum disparity for each pixel in the left-eye image in accordance with the energy function, so as to generate the dense disparity map.

According to the system in the embodiments of the present disclosure, the initial cost volume map set is generated in accordance with the left-eye image and the right-eye image, the cost aggregation is performed in accordance with the point cloud information obtained by the laser radar sensing system and the initial cost volume map set to create the energy function, and the optimum disparity for each pixel is solved in the left-eye image through the energy function, so as to generate the dense disparity map. The disparity is calculated in accordance with binocular disparity information and depth information obtained through the laser radar sensing system, so as to extract the dense disparity map accurately, thereby to improve the accuracy of the binocular stereo vision system for solving the disparity.

The present disclosure further provides in some embodiments an intelligent terminal, which includes a data collection device, a processor and a memory. The data collection device is configured to collect data, the memory is configured to store therein one or more program instructions, and the processor is configured to execute the one or more program instructions so as to implement the above-mentioned method.

The present disclosure further provides in some embodiments a computer-readable storage medium storing therein one or more program instructions. The one or more program instructions is executed by a processor so as to implement the above-mentioned method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. A method for extracting a dense disparity map using multi-sensor fusion based on at least one LiDAR and at least one binocular camera with a left camera and a right camera, comprising:

obtaining a left-eye image from the left camera of the at least one binocular camera and a right-eye image from the right camera of the at least one binocular camera in a road scenario;

obtaining point cloud information from the at least one LiDAR about the road scenario within a sensing range of the at least one LiDAR, wherein the point cloud information is real physical three-dimensional coordinates (x, y, z) obtained from the least one LiDAR within a sensing range of the road scenario;

generating an initial cost volume map set in accordance with the left-eye image from the left camera of the at least one binocular camera, the right-eye image from the right camera of the at least one binocular camera, and the point cloud information from the at least one LiDAR;

performing a multidirectional cost aggregation in accordance with the point cloud information and the initial cost volume map set to obtain a plurality of aggregation cost values, and creating an energy function in accordance with the multidirectional cost aggregation; and solving an optimum disparity for each pixel in the left-eye image in accordance with the energy function, so as to generate the dense disparity map, wherein the generating the initial cost volume map set in accordance with the left-eye image, the right-eye image and the point cloud information further comprises:

selecting a template window with a predetermined size in the left-eye image, and selecting a sliding window with the predetermined size in the right-eye image in a traversing manner;

enabling a maximum sliding distance to correspond to a maximum disparity $Disp_{max}$;

calculating a structural similarity value between the template window and each of the sliding window with the predetermined size to obtain a cost volume;

enabling a cost volume corresponding to a current sliding distance to be 0 and enabling a cost volume corresponding to the other sliding distance to be a maximum value when a sliding distance u and a depth information z in the point cloud information meet u=bf/z, where b represents a length of a baseline of the binocular camera and f represents a focal length of the binocular camera; and repeating the steps with respect to each pixel point in the left-eve image to generate the initial cost volume map set, wherein the calculating the structural similarity value further comprises calculating the structural similarity value using a Structural Similarity (SSIM) operator through:

$$SSIM(disp,\, p) = \frac{(2\mu_\phi\mu_\phi + C1)(\sigma_{\varphi\psi} + C2)}{\left(\mu_\varphi^2 + \mu_\psi^2 + C1\right)\left(\sigma_\varphi^2 + \sigma_\psi^2 + C2\right)}.$$

where $\mu$ represents an average value, $\sigma^2$ represents a variance, $\sigma$ represents a standard deviation, C1 and C2 are constants, $\varphi$ represents the template window, and $\psi$ represents the sliding window.

2. The method according to claim 1, wherein the solving the optimum disparity for each pixel in the left-eye image in accordance with the energy function so as to generate the dense disparity map further comprises: selecting a minimum value of the aggregation cost values as a final disparity so as to generate the dense disparity map.

* * * * *